United States Patent [19]
Menhorn et al.

[11] 4,406,930
[45] Sep. 27, 1983

[54] TROLLEY WIRE SECTION INSULATOR WITH TWO PARALLEL INSULATING SLIDING STRIPS

[75] Inventors: Hermann Menhorn, Mölln; Georg Müller, Buckenhof; Christoph Nitschke, Erlanger; Helmut Wehrberger, Röttenbach; Klaus Kaesewinkel, Reckling-hauser, all of Fed. Rep. of Germany

[73] Assignee: Siemens Aktiengesellschaft, Munich, Fed. Rep. of Germany

[21] Appl. No.: 317,745

[22] Filed: Nov. 3, 1981

[30] Foreign Application Priority Data

Nov. 13, 1980 [DE] Fed. Rep. of Germany ....... 3042870
Dec. 1, 1980 [DE] Fed. Rep. of Germany ....... 3045258
Jul. 20, 1981 [DE] Fed. Rep. of Germany ....... 3128634

[51] Int. Cl.³ ............... B60M 1/18; H01B 17/42
[52] U.S. Cl. .................... 191/39; 174/140 S
[58] Field of Search ............. 191/39; 174/140 S, 144; 238/152

[56] References Cited

U.S. PATENT DOCUMENTS 3,952,848  4/1976  Walker et al. ............. 191/39 X
4,250,982  2/1981  Senften .................... 191/39
4,350,851  9/1982  Seddon .................... 191/39

FOREIGN PATENT DOCUMENTS 2437722  2/1976  Fed. Rep. of Germany ........ 191/39
 558267  1/1975  Switzerland ................. 191/39
2059689  4/1980  United Kingdom ............. 191/39

*Primary Examiner*—Robert B. Reeves
*Assistant Examiner*—David F. Hubbuch
*Attorney, Agent, or Firm*—Kenyon & Kenyon

[57] ABSTRACT

A section insulator for trolley wires of electric railways is disclosed. The ends of two trolley wires are fastened to two insulating sliding strips between which arcing horns are arranged. The insulating sliding strips comprise a fiber-reinforced plastic wherein the filament fibers of the fiber reinforcement are stacked parallel to each other and are arranged perpendicularly to the sliding surface. The arcing horns are approximately U-shaped with the legs of the U-shape forming a leading runner and an adjusting loop bridged by an approximately V-shaped cross-piece. The arcing horns are disposed with the arc guiding parts facing each other and lying above the two insulating sliding strips in their operating position. Depressions are provided in the sliding surface of the insulating sliding strips to reduce accumulation of deposits.

13 Claims, 8 Drawing Figures

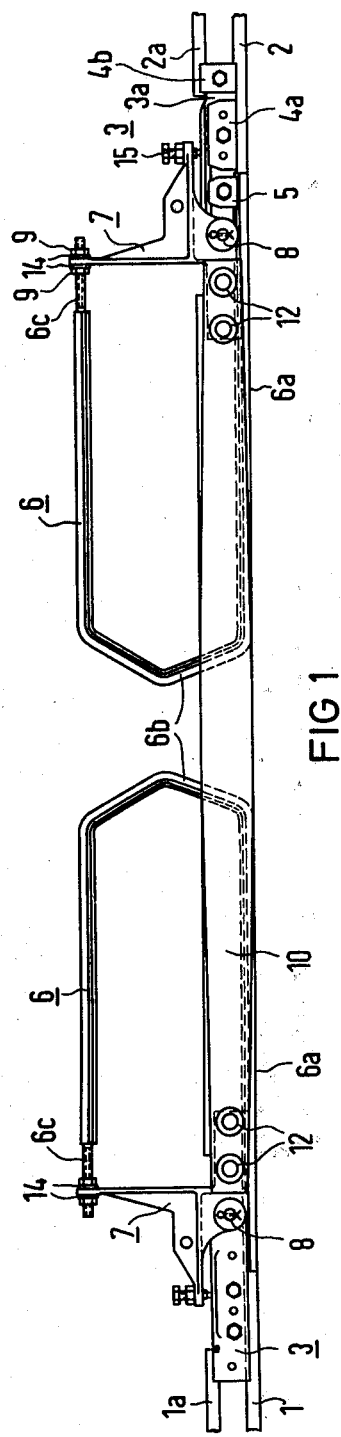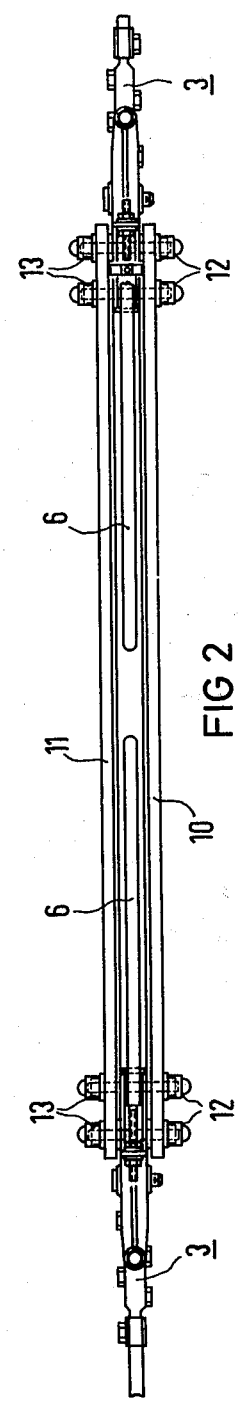

TROLLEY WIRE SECTION INSULATOR WITH TWO PARALLEL INSULATING SLIDING STRIPS

BACKGROUND OF THE INVENTION

The present invention relates to a section insulator for trolley wires of an electric railway.

A section insulator for trolley wires of electric railways is known, in which the two trolley wire ends are each fastened, via a trolley wire terminal and a brace, to two insulating sliding strips which are arranged with their flat sides in a common plane. The insulating sliding strips, which are made of fiber-reinforced plastic, form with their broad sides sliding surfaces for a current collector. Arc or spark horns are fastened to the braces between the two insulating sliding strips; the narrowest points of the spark horns facing each other lie approximately in or above the plane of the insulating sliding strips. The fiber reinforcement of the insulating sliding strips is formed by glass fibers arranged parallel to the sliding surface. To increase the leakage current resistance, the sliding surface of the insulating sliding strips is provided with a glass-free, wear-resistant layer.

OBJECT AND SUMMARY OF THE INVENTION

It is an object of the present invention to provide a section insulator for two trolley wires which has a longer service life, better operating reliability and less weight than prior art insulators.

This and other objects are achieved according to the invention by providing in a section insulator for two trolley wires of an electric railway comprising a trolley wire terminal fastened to each trolley wire, a brace fastened to each terminal, two insulating sliding strips connected to and extending between the braces having sides which form sliding surfaces for a current collector, and an arcing horn fastened to each brace between the two insulting sliding strips; insulating sliding strips made of a fiber-reinforced plastic in which filament fibers are disposed parallel to each other and perpendicularly to the sliding surface of the insulating sliding strips. The filament fibers are preferably bound (e.g., in layers) with a cycloaliphatic epoxy resin.

Further, arcing horns are provided which are approximately at least U-shaped. A U-shaped arcing horn in accordance with an aspect of the invention comprises a first leg of the U-shape extending from the brace and forming a leading runner, a second leg of the U-shape, forming an adjusting loop, spaced from the first leg and returned to the brace, and a cross-piece of approximately V-shape connecting the two legs and forming an arc guide. The second leg of each arcing horn is fastened to the brace, and insulating pieces are disposed between each second leg and the associated brace to insulate the second leg from the brace. The cross-pieces of the arcing horns forming the arc guide are arranged such that the tips of the V-shaped cross-pieces face each other and lie, in their operating position, above the two insulating sliding strips.

According to one aspect of the invention, the section insulator can be installed without the aid of a tensioning device, thereby substantially reducing installation time. A terminal for the section insulator according to this aspect of the invention includes a recess through which a cutting tool can be introduced to sever the respective terminal. The terminal can also comprise a clamp having first jaws for fastening the trolley wire thereto and second jaws longitudinally spaced from the first jaws for fastening a leg of the arcing horn, the recess being provided extending perpendicularly to the sliding surface along the bottom of the clamp between the first and second jaws through which the cutting tool can be introduced for severing a continuous trolley wire.

The trolley wire terminals and the braces preferably comprise a copper-tin-silicon alloy.

The sliding surface of each insulating sliding strip in accordance with another aspect of the invention has shallow depressions disposed transversely to the longitudinal axis of the surface, the depressions being spaced by mutual distances and the surface being adapted to slidably receive a sliding shoe of a current collector having a length considerably larger than said mutual spacings. The depressions can be disposed perpendicularly to the longitudinal axis of the surface. The depressions can be of dove-tail shape and can be filled with a carbon-repelling material.

The insulating sliding strips are preferably tapered smaller toward both ends thereof. Also they are preferably symmetrical about the sliding surfaces so that they can be removed, rotated 180° and used with an opposite surface receiving the sliding shoe.

An insulating section according to the invention has greater mechanical strength and greater stiffness while retaining good sliding properties. This results in greater torsional stiffness of the section insulator. An arc is prevented from burning in the immediate vicinity of the two insulating sliding strips and which have a destructive effect on the latter. This increases service life and operational reliability. It is further possible according to the invention to bring the insulating sliding strips very close together, so that twisting has little effect on the travel of the current collector.

The above and other objects, features, aspects and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which:

FIG. 1 is a side view of a section insulator according to the present invention for trolley wires;

FIG. 2 is a top view of the section insulator of FIG. 1;

DESCRIPTION OF THE PREFERRED EMBODIMENT

Figure 3:
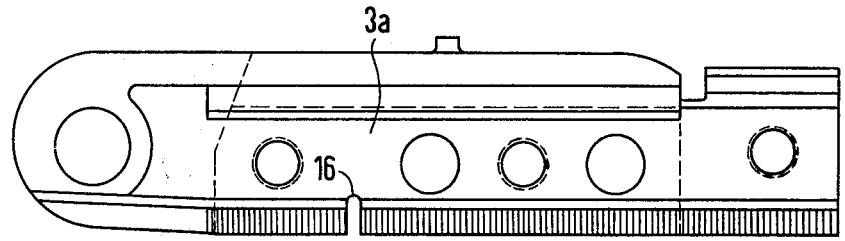
FIG. 3 is a side view of an embodiment of a clamp according to the invention for a trolley wire terminal which can form part of the section insulator of FIG. 1.
Figure 4:
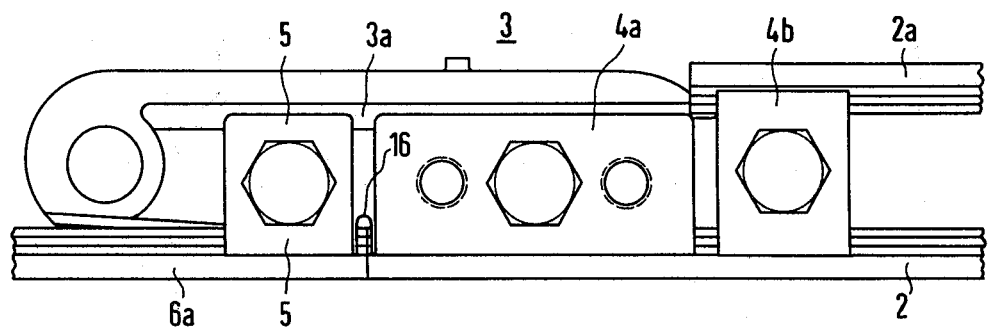
FIG. 4 is a side view of another embodiment of a clamp according to the invention for a trolley wire terminal which includes a clamped-on leading runner of an arcing horn and which can form part of the section insulator of FIG. 1.

Referring more particularly to the drawings, embodiments of a section insulator for bridging the ends of the trolley wires of two trolley wire sections in an insulating manner are illustrated.

Referring to FIG. 1, a section insulator according to the invention comprises two trolley wire terminals 3 for gripping the ends 1, 2 of two trolley wires. The wires 1, 2 are clamped to a clamp 3a of the trolley wire terminal 3 by means of clamping jaws 4a. A clamping jaw 4b is provided at clamp 3a of the trolley wire terminal 3 for clamping a short trolley wire section 1a, 2a, next to the respective trolley wire travelled by the vehicle current collector and allows a soft transition for the current collector when it travels from a respective trolley wire to a respective terminal.

At the clamp 3a of the trolley wire terminal 3 is further attached a clamping jaw 5 for clamping the leading end of a runner 6a (lower runner) of a spark horn 6. A brace 7 is adjustably supported at each clamp 3a via a bolt 8. Horizontal holes are provided in the braces for fastening two insulating sliding strips 10, 11 by means of threaded bolts 12 and nuts 13. The insulating sliding strips 10, 11 are disposed edge-wise parallel to each other, i.e. with their broad sides parallel to each other, and laterally of the arcing horns 6 (FIG. 2), so that they can be fastened jointly to the bracing pieces 7 by the threaded bolts 12. The insulating sliding strips 10, 11 are arranged with their flat (narrow) sides perpendicularly to the sliding shoes of the current collector. Thereby, the size and the weight of the bracing pieces 7 can be maintained small. It is advantageous to make the trolley wire terminal and the bracing piece 7 of a copper-tin-silicon alloy. Thereby, high corrosion resistance and great strength are obtained.

The lower narrow sides of the insulating sliding strips 10, 11 (FIG. 1) form sliding surfaces for the sliding shoes of a current collector. The insulating sliding strips 10, 11 are narrower in width towards their ends than in the middle, so that a desired profile is obtained which insures proper travel of the sliding surfaces of the current collector. In order to enable the insulating sliding strips to be reused if their sliding surfaces are worn or damaged, the taper at the two ends of each insulating sliding strip is symmetrical with respect to the top and bottom of the insulating strip. Should the sliding surface of an insulated sliding strip become worn or damaged, the respective insulating sliding strip can be removed, rotated 180° about its longitudinal axis, and replaced so that the opposite surface can be used.

The insulating sliding strips 10, 11 are preferably comprised of fiber-reinforced plastic, the fiber reinforcement being formed by filament fibers disposed parallel to each other and perpendicularly to the sliding surface. A preferred fiber-reinforced plastic is glass. A cycloaliphatic epoxy resin is a preferred binder to press the fibers to form a solid body. High resistance to thermal and UV radiation as well as high leakage current resistance of the section insulator can thereby be obtained while good sliding properties and great mechanical strength are assured.

The arcing horns 6, whose components have the same cross-sectional shape as the trolley wires, are approximately at least U-shaped, one leg 6a of the U-shape forming the leading lower runner extending from the brace 7, the other leg 6c of the U-shape forming an adjusting loop which is returned to the brace 7, and the cross piece 6b connecting the two legs being approximately V-shaped and forming an arc guide or carrying part.

Advantageously, the portions of the arcing horns 6 forming the arc guide or carrying parts 6b are arranged in such a manner that the tips of the V-shaped portions are facing each other and lie, in their operating position, above the two insulating sliding strips 10, 11. This arrangement enables the two insulating sliding strips 10, 11 to be brought very close together without the danger of arcs destroying the insulating sliding strips.

The upper ends 6c of the arcing horns 6, which serve as adjustment loops, are threaded, and are adjustably connected by nuts 9, to the respective brace 7. The upper ends 6c are electrically insulated from the respective braces by insulating spacers 14. This arrangement prevents a burning arc from being fed via the brace 7 and the adjusting loop 6c parallel to the lower runner 6a, so that rapid quenching of the arc can be achieved. An adjusting screw 15 arranged at a projection of the bracing piece 7 and braced against the trolley wire terminal 3 enables an adjustment of the position of the lower runner 6a (leading runner) of a respective arcing horn 6 relative to the position of the trolley wire 1 or 2.

In a conventionally installed section insulator, an uninterrupted trolley wire 1 or 2 is load-relieved at the point of installation by a relief device (chain pull or the like) clamped parallel to the wire. The length of cut required for the installation of the section insulator is measured. Then, the corresponding trolley wire section is cut out. During the procedure, the ends of the trolley wires can get bent or twisted which makes it more difficult to clamp the section insulator on.

Substantial simplification of the installation procedure can be attained using the section insulator according to the invention without the aid of a tensioning device by the provision of a cutting tool inserted in a recess 16 (FIG. 3) extending perpendicularly in and along the bottom of clamp 3a of the trolley wire terminals 3. The cutting tool is used to sever a continuous trolley wire at a point between the clamping jaw 4a for the trolley wire and the clamping jaw 5 for the arcing horn 6. The recess is preferably U-shaped. The arrangement described above enables the section insulator to be installed in an existing trolley wire at any desired point without auxiliary tensioning. For this purpose, the section insulator without the arcing horns is placed on the continuous trolley wire and clamped to it by means of the clamping jaws 4a. Then, the trolley wire is cut and severed at the recesses 16 provided in the clamps 3a of the trolley wire terminals, and the cut trolley wire section is removed. The two arcing horns 6 are next placed with their lower runners 6a against the ends of the trolley wires 1 and 2 without a gap and clamped on by means of the clamping jaws 5. To avoid sparkovers, plastic caps 17 are placed on the bolt ends 12 and nuts 13 (FIG. 1).

After extended operation, the leakage current resistance of the sliding surfaces of the insulating sliding strips 10, 11 can be impaired, among other things, due to wear of the filament fibers, and by deposits of abraded material (e.g., carbon dust) from the sliding shoes of the current collectors. To avoid this, the insulating sliding strips can be cleaned at predetermined time intervals.

Figure 5:
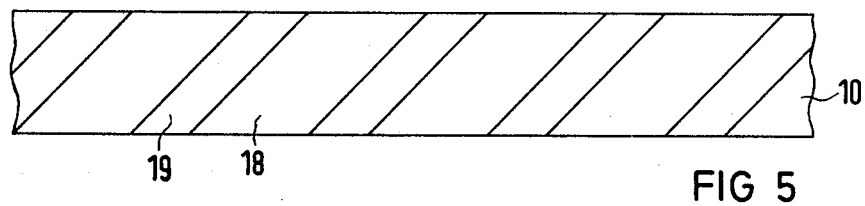
FIG. 5 is a plan view of a portion of an insulating sliding strip showing a sliding surface according to an embodiment of the invention which can form part of the section insulator of FIG. 1.
Figure 6:
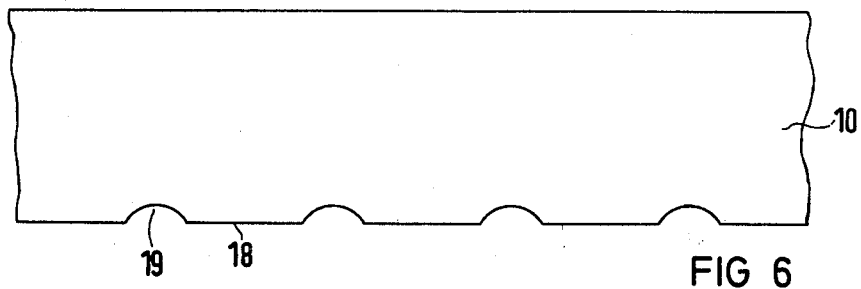
FIG. 6 is an elevation view of the insulated sliding strip of FIG. 5.

Advantageously, deposits at the sliding surfaces of the insulating sliding strips can be reduced by the provision that the sliding surfaces 18 of the insulating sliding strips 10, 11 have shallow depressions which are disposed at an angle, i.e. transversely, to their longitudinal axes (FIGS. 5 and 6).

Figure 7:
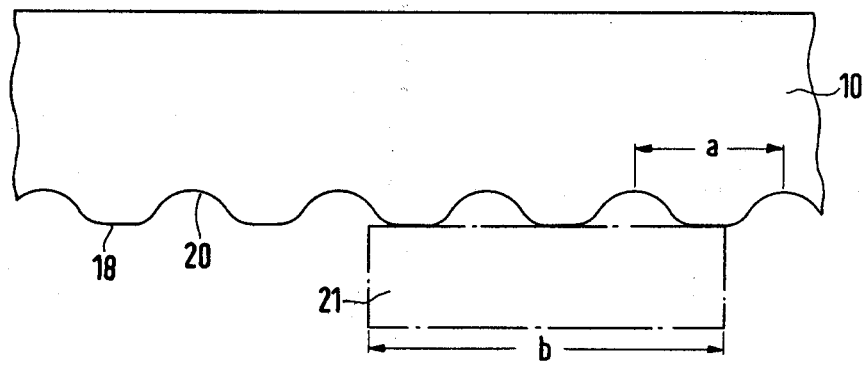
FIG. 7 is an elevation view of a portion of an insulating sliding strip showing a sliding surface according to another embodiment of the invention which can form part of the section insulator of FIG. 1.

According to the embodiment shown in FIG. 7, the sliding surfaces 18 of the insulating sliding strips 10, 11 are provided with shallow depressions 20 which are disposed transversely, either perpendicularly or at an angle, to the longitudinal axis of the sliding surfaces, and the mutual spacings a of the depressions are substantially smaller than the length b of a sliding shoe 21 of a current collector passing over the insulating sliding strips.

Figure 8:
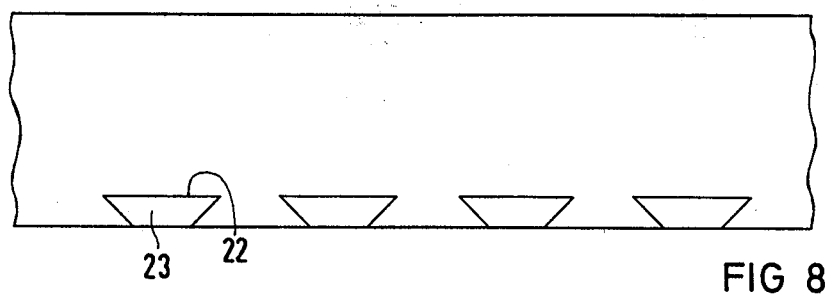
FIG. 8 is an elevation view of a portion of an insulating sliding strip showing a sliding surface having depressions which can be filled with plastic in accordance with an aspect of the invention.

In the embodiment shown in FIG. 8, depressions 22 in the sliding surface 18 can also be filled with a carbon-repelling material 23, particularly plastic, for increasing leakage current resistance. Depressions 22 are advantageously dove-tailed in order to prevent the material filling the depressions from coming out.

The advantages of the present invention, as well as certain changes and modifications of the disclosed embodiments thereof will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. In a section insulator for two trolley wires of an electric railway comprising a trolley wire terminal fastened to each trolley wire, a brace fastened to each terminal, two insulating sliding strips connected to and extending between the braces, sides of the insulating sliding strips forming sliding surfaces for a current collector, and an arcing horn fastened to each brace between the two insulating sliding strips, the improvement comprising insulating sliding strips made of a fiber-reinforced plastic in which filament fibers are disposed parallel to each other and perpendicularly to the sliding surface, and arcing horns which are approximately at least U-shaped with a first leg of the U-shape extending from the brace and forming a leading runner, a second leg of the U-shape spaced from the first leg and returned to the brace, the second leg forming an adjusting loop, and a cross-piece of approximately V-shape connecting the two legs and forming an arc guide.

2. The improvement according to claim 1 wherein the second leg of each arcing horn is fastened to the brace, and insulating pieces are disposed between each second leg and the associated brace to insulate the second leg from the brace.

3. The improvement according to claim 2 wherein the terminal comprises a clamp having first jaws for fastening the trolley wire thereto and second jaws longitudinally spaced from the first jaws for fastening the first leg of the arcing horn, a recess being provided extending perpendicularly to the sliding surface along the bottom of the clamp between the first and second jaws through which a cutting tool can be introduced for severing a continuous trolley wire.

4. The improvement according to claim 3 wherein the trolley wire terminals comprise a copper-tin-silicon alloy.

5. The improvement according to claim 3 wherein the braces comprise a copper-tin-silicon alloy.

6. The improvement according to claim 2 wherein the insulating sliding strips are tapered smaller toward both ends thereof.

7. The improvement according to claim 1 wherein the cross pieces of the arcing horns forming the arc guide are arranged such that the tips of the V-shaped cross pieces face each other and lie, in their operating position, above the two insulating sliding strips.

8. The improvement according to claim 1 wherein sa cycloaliphatic epoxy resin binds the filament fibers.

9. The improvement according to claim 1 wherein the sliding surface of each insulating sliding strip has shallow depressions disposed transversely to the longitudinal axis of the insulated sliding strip for reducing adhering of deposits to the respective surface.

10. The improvement according to claim 1 wherein the sliding surfaces of each insulating sliding strip has shallow depressions disposed transversely to the longitudinal axis of the surface, the depressions being spaced by mutual distances and the surface being adapted to slidably receive a sliding shoe of a current collector having a length considerably larger than said mutual spacings.

11. The improvement according to claim 10 wherein the depressions are disposed perpendicularly to the longidutinal axis of the surface.

12. The improvement according to claim 9, 10 or 11 wherein the depressions are of dove-tail shape.

13. The improvement according to claim 12 wherein the depressions are filled with a carbon-repelling material.

* * * * *